United States Patent
Hoffman

(10) Patent No.: US 7,146,577 B2
(45) Date of Patent: Dec. 5, 2006

(54) SIGNATURE CAPTURE TERMINAL

(75) Inventor: Mark S. Hoffman, Lawrenceville, GA (US)

(73) Assignee: NCR Corporation, Dayton, OH (US)

( * ) Notice: Subject to any disclaimer, the term of this patent is extended or adjusted under 35 U.S.C. 154(b) by 946 days.

(21) Appl. No.: 09/818,923

(22) Filed: Mar. 27, 2001

(65) Prior Publication Data

US 2002/0140714 A1 Oct. 3, 2002

(51) Int. Cl.
*G06F 3/00* (2006.01)
*G09G 5/00* (2006.01)

(52) U.S. Cl. ..................... 715/865; 715/729

(58) Field of Classification Search .......... 345/716, 345/727, 728, 729, 865, 864, 978; 705/72, 705/73, 77, 16, 17, 18; 715/865, 729
See application file for complete search history.

(56) References Cited

U.S. PATENT DOCUMENTS 5,287,102 A * 2/1994 McKiel, Jr. ............ 340/825.19
5,589,855 A * 12/1996 Blumstein et al. .......... 345/173
6,061,666 A * 5/2000 Do et al. .................... 705/43
6,327,575 B1 * 12/2001 Katz .......................... 705/16
6,464,135 B1 * 10/2002 Cohen et al. ............... 235/379
6,615,194 B1 * 9/2003 Deutsch et al. ............. 705/75

OTHER PUBLICATIONS

SigBox. OCX AciveX Control for Point of Sale Terminals, Version 4.3 rev 2, User's Manual, Oct. 1999 @ pos.com.*
Speed Pen, Dec. 1975, IBM Technical Disclosure, vol. No. 18, Issue No. 7, pp. 2374-2375.*

* cited by examiner

*Primary Examiner*—Kieu D. Vu
(74) *Attorney, Agent, or Firm*—Maginot, Moore & Beck LLP

(57) ABSTRACT

Various forms of a signature capture terminal provide added flexibility, and easier access or use by disabled individuals. The signature capture terminal provides audio feedback to the user in response to user input. The audio feedback may take various forms such as secure audio, text-to-speech, and/or touchtone. User input may be entry of a PIN, a signature, or other data. In one form, input to the signature capture terminal is accomplished via a disability access device. The disability access device may be an overlay, a configured access card, or a specially adapted input terminal.

18 Claims, 12 Drawing Sheets

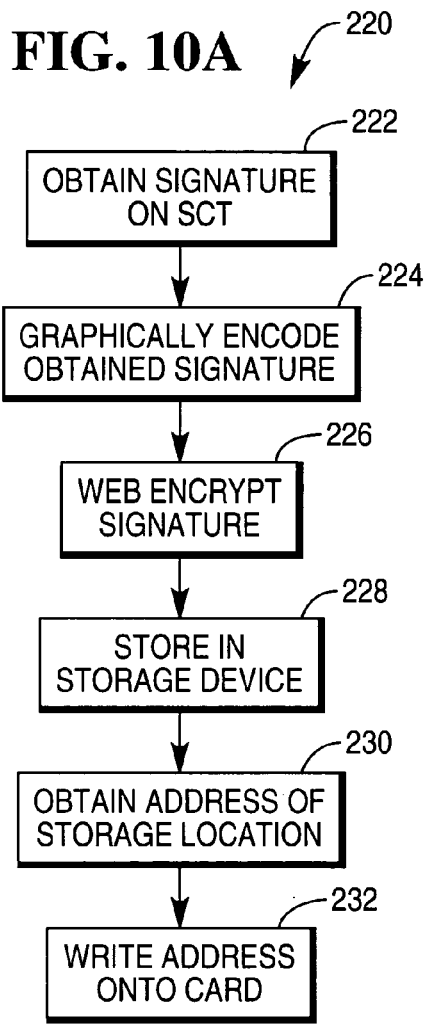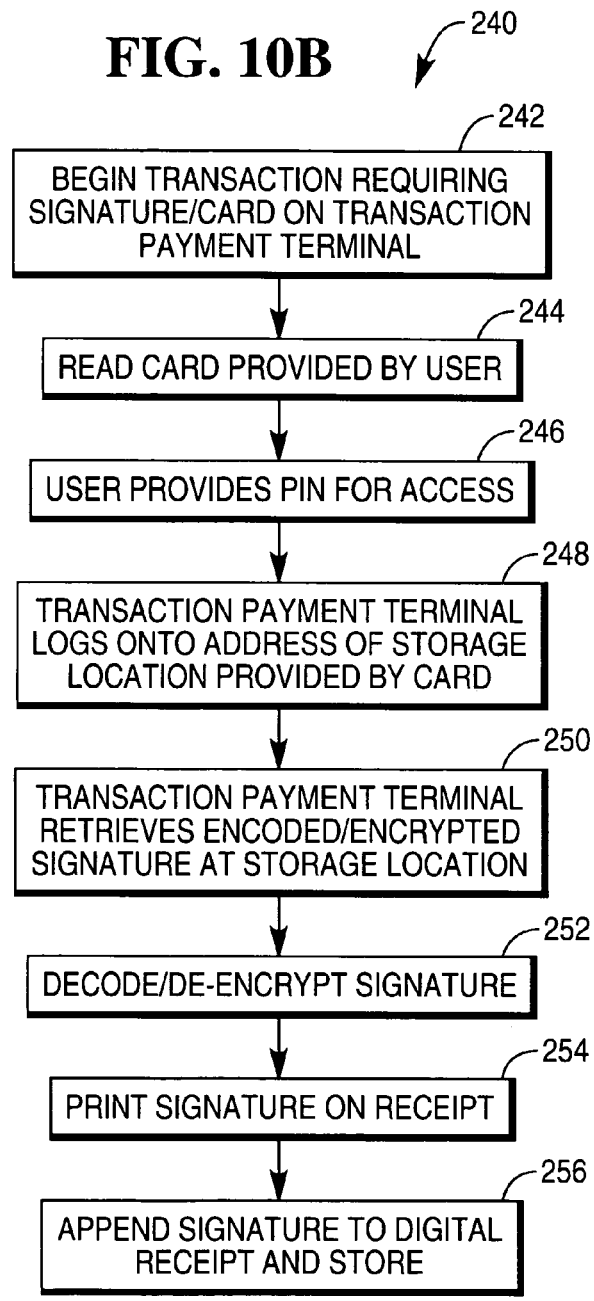

SIGNATURE CAPTURE TERMINAL

FIELD OF THE INVENTION

The present invention relates generally to signature capture terminals and, more particularly, to signature capture terminals that are universally accessible.

DESCRIPTION OF THE PRIOR ART

The Federal Telecommunications Act, bill 508, mandates that electronic telecommunications equipment bought by the Federal Government shall be universally accessible to all users. This means that such electronic telecommunications equipment must be able to accommodate accessibility by handicapped users, such as visually impaired or blind individuals. Even without this mandate, electronic telecommunications equipment, as well as other types of electronic equipment/devices, should be manufactured to be universally accessible to all users. All users include individuals who are handicapped in some manner.

It is understandable that individuals who are visually impaired or blind have a difficult time endorsing documents that require a signature. It is challenging for such individuals to know exactly where to write their signature on the document. This includes endorsing checks, signing credit card receipts, signing contracts, and the like. In addition to paper documents that require a signature, many transactions that are performed on or by electronic devices also require a signature. In these cases, a signature is provided to the electronic device in a non-paper manner.

In general such electronic devices include various computer-controlled or processor-controlled devices such as retail terminals, kiosks, ATMs, electronic fund transfer (EFT) devices, and the like. Depending on the particular transaction being performed on the electronic device, a signature may be required. In an exemplary case in which an individual utilizes a credit card or other similar payment option while using retail terminal, for instance, a signature of the credit card holder is required. In all electronic devices that need to obtain a signature for a particular transaction, a signature capture device is typically provided in order to allow the electronic capture of the user's signature. However, even in the "electronic signature" case, the same problems still exist with respect to a visually impaired or blind individual knowing where to provide a signature relative to the signature capture device.

Additional problems exist with respect to handicapped individuals because of the widespread use of electronic devices. Electronic devices require the input of data. It is often difficult for handicapped individuals to manipulate or use the various forms of data entry, such as a keyboard or keypad, that are provided on the electronic device. Further, due to the difficulty in entering data in electronic devices, the handicapped individual is also often an easy for fraud.

The above sets forth only a few of the obstacles encountered by handicapped individuals when using current electronic devices. Numerous other obstacles exist for the handicapped individual when using various electronic devices due to a lack of thoughtful design with respect to a handicapped individual.

SUMMARY OF THE INVENTION

The present invention provides various forms of an electronic signature capture terminal that are operative to provide easier access to the various functionality of the signature capture terminal for disabled individuals.

In one form, the signature capture terminal provides audio feedback to a user in response to input to the signature capture terminal. The audio feedback may take various forms such as secure audio, text-to-speech, and/or touch-tone. Input may be entry of a PIN, a signature, or other data either from a user or an operator. In one form, input to the signature capture terminal is accomplished via a disability access device. The disability access device may be an overlay, a configured access card, or a specially adapted input terminal.

BRIEF DESCRIPTION OF THE DRAWINGS

The above-mentioned and other features and advantages of this invention, and the manner of attaining them, will become more apparent and the invention will be better understood by reference to the following descriptions of embodiments of the invention taken in conjunction with the accompanying drawings, wherein:

FIG. 10A is a flow diagram of a manner of operation of an aspect of the present invention;

FIG. 10B is a flow diagram of a manner of operation of an aspect of the present invention that may be used with the manner of operation pertaining to FIG. 10A;

Corresponding reference characters indicate corresponding parts throughout the several views.

DETAILED DESCRIPTION

While the invention is susceptible to various modifications and alternative forms, the specific embodiment(s)

shown and/or described herein is by way of example. It should thus be appreciated that there is no intent to limit the invention to the particular form disclosed, as the intention is to cover all modifications, equivalents, and alternatives falling within the spirit and scope of the invention as defined by the appended claims.

Figure 1:
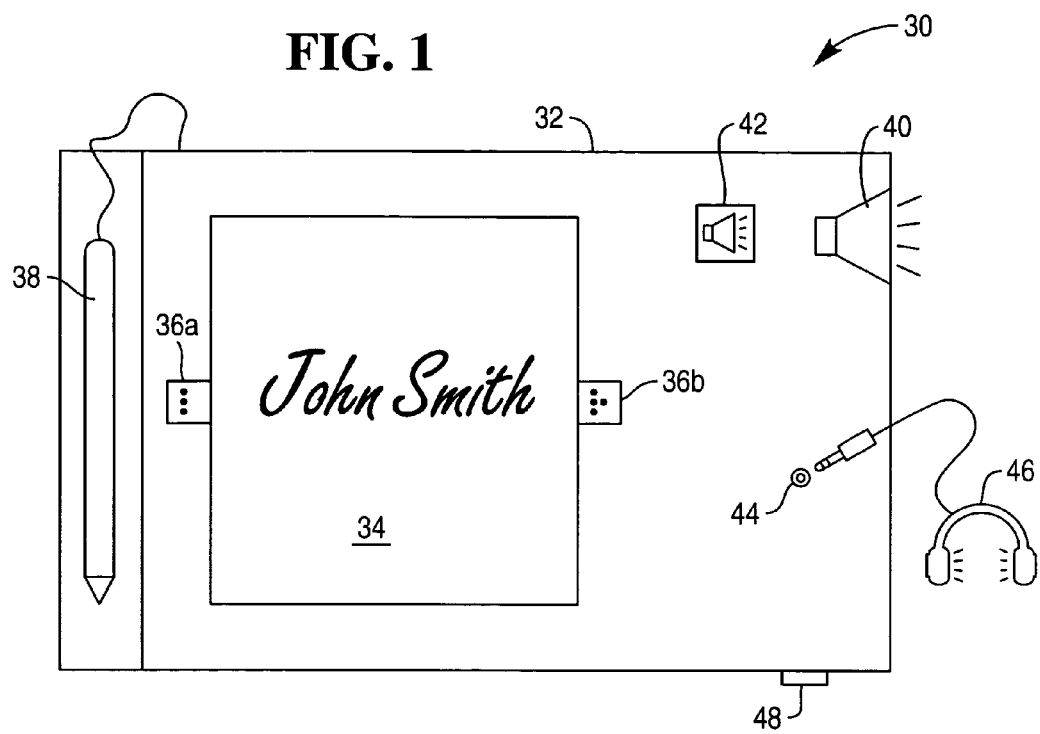
FIG. 1 is a top plan view of an exemplary signature capture terminal configured to implement an aspect of the present invention in accordance with the principles presented herein.

Referring now to FIG. 1, there is shown an exemplary signature capture terminal or device (SCT), generally designated 30, that is operative/configured to carry out various aspects of the present invention in accordance with the principles presented herein. The SCT 30 has a housing 32 that is preferably configured to allow the SCT 30 to rest on a countertop or the like. The housing 32 may be adapted to fit onto a swivel base (not shown) that is mounted onto a countertop or the like.

The SCT 30 further includes a signature capture area 34 onto which a user writes his/her signature preferably with a stylus 38. The signature capture area 34 is preferably a screen and/or display such as a touch-screen, sonar screen, pressure transducer or the like that is operative to accept the signature written thereon. Accepting the signature includes electronically recognizing and/or capturing the graphic nature of the signature. The signature capture area 34 also preferably displays or shows the signature as it is being written.

In conjunction with the signature capture area 34, the SCT 30 includes raised alignment tabs 36a and 36b that are disposed on opposite sides of the signature capture area 34. The alignment tabs 36a and 36b are also disposed substantially at the middle of the signature capture area in order to provide tactile alignment indicia. Such tactile alignment indicia allow a blind, visually handicapped, and/or physically limited individual (collectively, a handicapped individual) to be able to know where the signature area 34 is (i.e. between the alignment tabs 36a and 36b) as well as the center point of the signature capture area 34. Additionally, the alignment tabs 36a and 36b each has Braille or other similar indicia thereon indicating the center point and demarcation of the boundaries of the signature capture area 34.

The SCT 30 further includes a speaker 40 (or speakers) that is/are operative to produce sound in accordance with the principles presented herein. A volume control 42 such as a button is provided to allow the user to raise and/or lower the volume of sound emanating from the speaker 40. In one form, the volume control 42 may only raise the volume of the speaker 40 since the volume may be self-adjusting back to an original level once a transaction on the SCT 30 is complete. Of course, other schemes may be utilized. A headphone jack 44 is also provided that accepts a pair of headphones 46. Preferably, when the headphones 46 are coupled to the headphone jack 44, the speaker 40 is disabled such that any sound produced/generated by the SCT 30 will not be provided to the speaker, but rather only to the headphones 46. The volume control 42 is also preferably operative to control both the volume of the speaker and the volume of the headphones in the manner set forth above. The SCT 30 may also include a port 48 such as a USB (Universal Serial Bus) or other type of port in order to couple a peripheral or the like to the SCT 30.

In accordance with an aspect of the present invention, the SCT 30 is operative to accept or receive a signature of a user (e.g. "John Smith") on the signature capture area 34 using the stylus 38. Once the signature capture area 34 is ascertained by the user, of which the alignment tabs 36a and 36b are helpful, the user is ready to provide their signature. As the signature is entered onto the signature capture area 34 of the SCT 30, the SCT 30 translates the inputted graphic signature into an electronic signal. The SCT 30 may also display the signature as it is being written. Additionally, as the signature is written onto the signature capture area 34 an audio signal is produced/generated by the SCT 30 that is provided to the speaker 40 and/or headphones 46. The generated audio signal corresponds to or changes with the signature as it is inputted onto the signature capture area 34. In particular, at least one characteristic of the generated audio signal varies or changes in accordance with variations in the received signature. The characteristic of the audio signal may be frequency, pitch, or amplitude (volume). In another form, the generated audio signal may vary in two or more characteristics. The variation in the received signature may be a change in the horizontal position of the signature or stylus 38 used to write or enter the signature onto the SCT 30, the vertical position thereof, or a combination of a change in the horizontal and vertical position thereof within the signature capture area 34.

The generated audio signal may have an initial starting point that is related to a particular position within the signature capture area 34. Thus the characteristic of the audio signal may be different for each starting location within the signature capture area 34. The characteristic of the generated audio signal may be the same no matter where the user starts the entry of the signature. In the case where two characteristics, such as frequency and amplitude, change or vary, the frequency may change as the vertical position of the signature changes while the amplitude may change as the horizontal position of the signature changes. In this manner, the user entering his/her signature may know where they are within the signature capture area 34.

In one form, the SCT 30 provides an audible or audio of a signature. In this case, either pitch (tone) or amplitude (volume) may be used at a particular frequency/level as the case may be as the starting point. The starting point provides a reference for the user that the user then attempts to duplicate. Once the starting point is duplicated, the user then knows he/she is at a proper starting place of the signature capture area 34 for the signature. Thereafter, the frequency amplitude and/or other characteristic is varied as indicated above.

As an example, when the SCT 30 is ready to accept a signature, a tone of a particular frequency is produced and provided as audio via the speaker 40 and/or headphones 46 is applied to the signature capture area 34 a tone will be produced whose frequency depends on the position of the styles 38 on the signature capture area 34. Moving the styles 38 changes the tone. When the starting point tone matches the styles tone, the user knows he/she is at the proper location of the signature capture area 34 to begin writing/entry of the signature.

The generated audio signal may be stored in a suitable storage device. In the case of a retail transaction, the generated audio signal may be appended to a digital receipt generated for the particular transaction and stored with the digital receipt. The generated audio signal will have a particular pattern that may be used for matching and/or identification purposes regarding other transactions.

It should be appreciated that the SCT 30 of FIG. 1 may be utilized in a variety of applications and/or circumstances. Without being exhaustive, the SCT 30 may be used for electronic fund transfers (EFTs), as a credit card signature capture device for purchase transactions, and the like.

Figure 2:
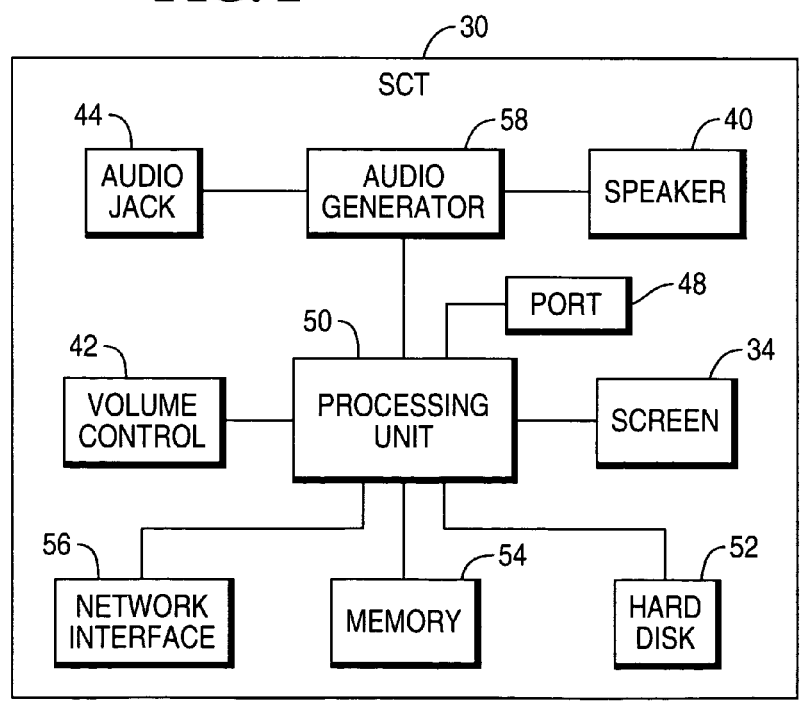
FIG. 2 is a block diagram of the components of the exemplary signature capture terminal of FIG. 1.

Referring to FIG. 2, a block diagram of the components of the SCT 30 is shown. It should be initially understood that the block diagram does not show each and/or every physical/ electrical connection between the circuitry/logic of the various blocks of circuitry/logic and/or components, only the general configuration of the various components. The SCT 30 includes a processing unit of appropriate circuitry/logic that is generally operative to be a main processing component, memory 54 such as RAM that is operative to temporarily store program instructions (i.e. software) for use by the processing unit and other components, and a mass storage device 52 (i.e. hard disk) that is operative to store program instructions of various types for operation of the SCT 30. The SCT 30 further includes an audio generator 58 of appropriate circuitry/logic that is generally operative to generate or produce the signature audio signal as described above. The audio jack 44 and the speaker 40 are in communication with the audio generator 58 such that the generated signature audio signal is provided to either or both the speaker 40 and audio jack 44. A network interface 56 of appropriate circuitry/logic may also be provided in order to allow the SCT 30 to be in communication with other devices.

Figure 3:
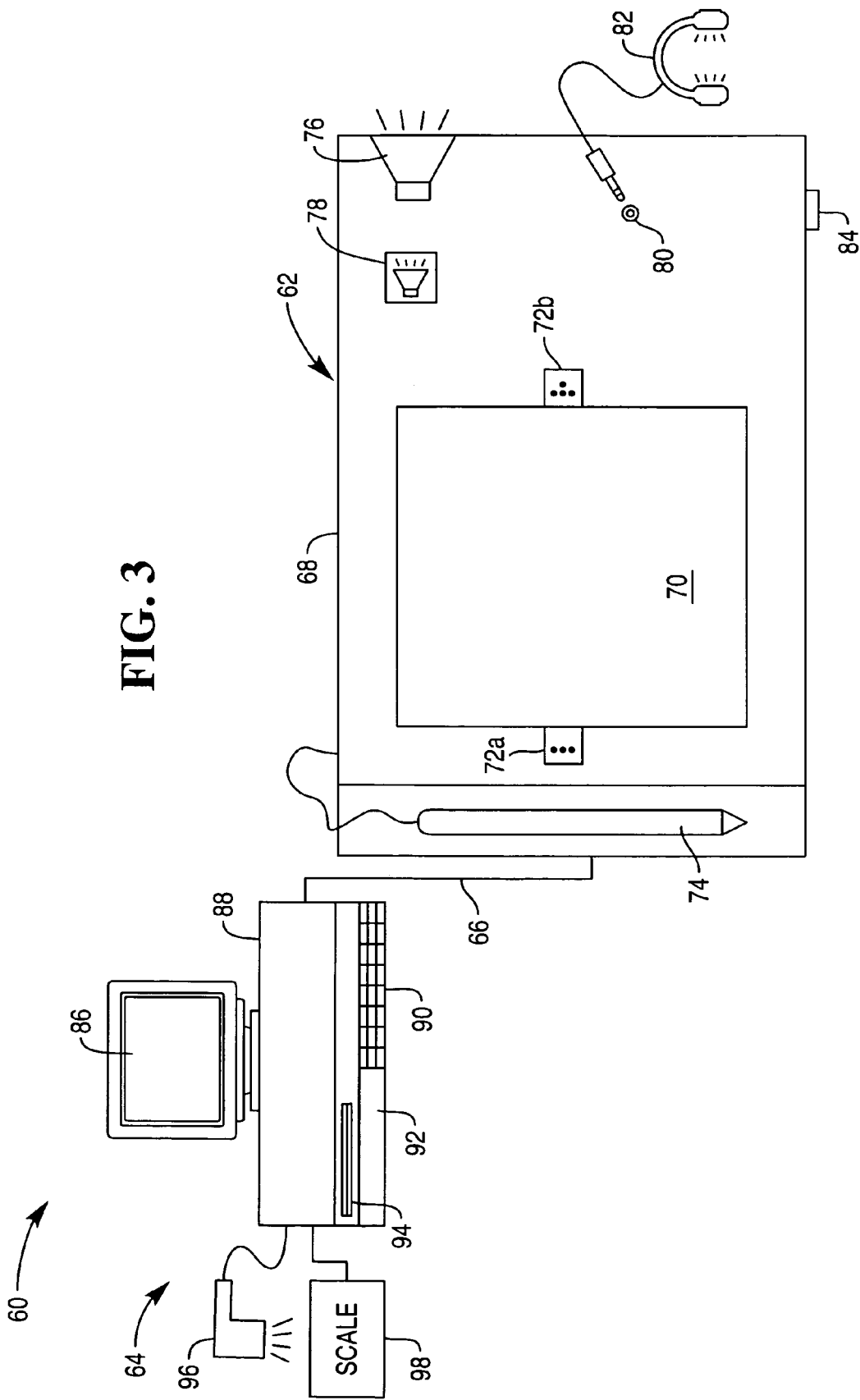
FIG. 3 is a diagram of an exemplary system having a retail terminal and a signature capture terminal that is configured to implement an aspect of the present invention in accordance with the principles presented herein.

Referring to FIG. 3 there is depicted a system, generally designated 60, that is operative to carry out an aspect of the present invention in accordance with the principles presented herein. In particular, the system 60 is operative to receive a signature and produce a signature audio signal in substantially the same manner as that described with reference to FIGS. 1 and 2. However, in FIG. 3, a signature capture terminal (SCT) 62 is coupled to a retail terminal 64 via a communication line 66. The system 60 is typical of a point-of-service retail terminal such as are located in grocery stores and other retail outlets. Thus, in this embodiment, the SCT 62 may not contain every component/function/feature as the stand-alone SCT 30.

The SCT 62 includes a housing 68 that supports a signature capture area 70 of the same type as the signature capture area 34 of the SCT 30. Disposed on either side of the signature capture area 70 are raised alignment tabs 72a and 72b. The alignment tabs 72a and 72b include tactile indicia such as Braille for aiding in locating the boundaries of the signature capture area 70, and particularly the center line thereof in like manner to the alignment tabs 36a and 36b of the SCT 30. A stylus 74 is included as a writing instrument for the user to enter his/her signature onto the signature capture area 70. The SCT 62 further includes a speaker 76, a headphone jack for receipt of a pair of headphones 82, a volume control 78, and a port 84, each of which functions and/or operates in the same manner as the corresponding parts of the SCT 30. The SCT 62, however, is adapted to be used in conjunction with a retail terminal or like device and not as a stand-alone terminal. As such, the SCT 62 may not have every component/feature/function as the SCT 30. However, it should be appreciated that the SCT 62 along with the retail terminal 64 is operative in substantially the same manner as the SCT 30.

The retail terminal 64 has a housing 88 that encloses various components and/or circuitry/logic thereof, and includes a display 86, a keyboard/keypad 90 as a manual input device, a cash drawer 92, and a card reader 94. The retail terminal 64 further includes a scanner 96 and a scale 98 that are shown as coupled to the housing 88. It should be appreciated that the retail terminal 64 shown in FIG. 3 is only exemplary of one of the many forms that the retail terminal may take. Therefore, the retail terminal may take any form such as an operator-assisted type retail terminal, a self-service retail terminal, or otherwise. The principles of the present invention are the same regardless of the form of the retail terminal.

In the system 60, a purchase transaction is performed on or by the retail terminal 64 and if it is necessary to obtain a signature of the consumer, the signature is obtained on the SCT 62. The SCT 62 is typically mounted proximate to the retail terminal 64. The SCT 62 may provide an audible signal when it is ready to accept a signature on the signature capture area 70. The consumer then writes his/her signature on the signature capture area 70 typically with the supplied stylus 74. The received signature is converted into an audio signal that is audibly provided to the speaker 76 and/or the headphones 82 in the same manner as that for the SCT 30. More particularly, the SCT 62 converts the signature written onto the signature capture area 70 into an electronic signal that is then converted into an audio signal. The audio signal is then provided to the speaker 76 and/or headphones 82 for receipt by the consumer. The electronic signal representing the received signature may also be stored as a graphic file, i.e. as an electronic representation of the received signature.

In the system 60, the SCT 62 is operative to generate and provide various audio signals that correspond to various inputs to the system 60 both by the user and an operator of the retail terminal 64. In this manner, the user can hear each input, transaction, or event performed on and/or by the system 60. Preferably, each such input, transaction, or event is characterized by a different audio signal.

Figure 4:
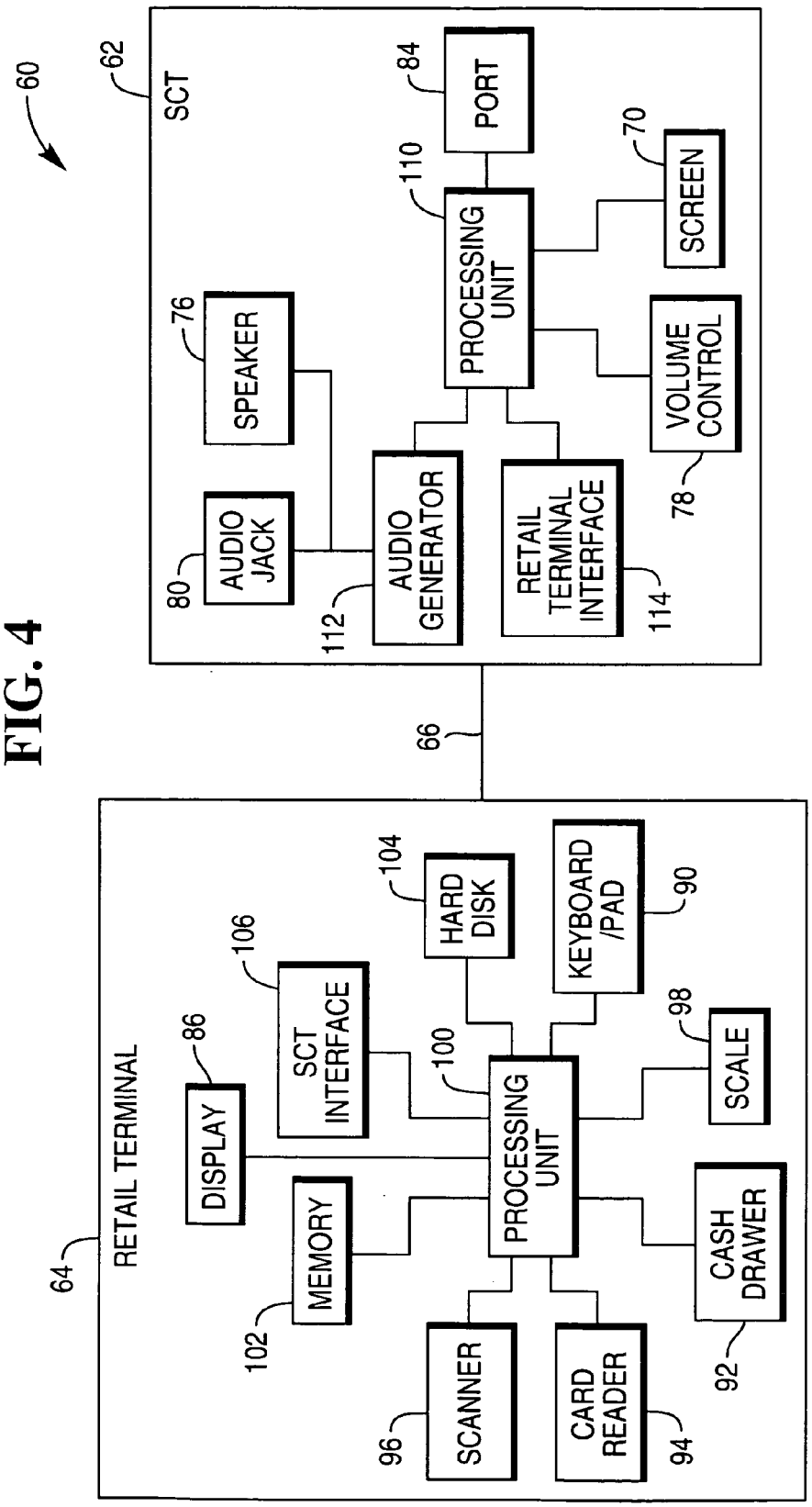
FIG. 4 is a block diagram of the components of the exemplary system of FIG. 3.

FIG. 4 depicts a block diagram of the various components of the system 60. It should be initially understood that the interconnections shown with respect to the retail terminal 64 and the SCT 62 are only exemplary and may not necessarily represent all of the various connections of the circuitry/logic employed to carry out the various features/functions herein ascribed to the various components.

The retail terminal 64 includes a processing unit 100 to which is coupled the display 86 (with or without a graphics adapter, not shown), the keyboard/keypad 90, the cash drawer 92, the scanner 96, the card reader 94, and the scale 98. The retail terminal 64 also includes memory 102 that is operative to at least temporarily receive and store program instructions for operation of the retail terminal 64 and the SCT 62. These program instructions are stored, long term, in a hard disk 104 or other storage device. An SCT interface 106 or other similar component/device is also provided for communication with the SCT 62.

The SCT 62 may include a processing unit 110 or other device operative to regulate communication between the various components of the SCT 62 and the retail terminal 64, and coordinate the operation of the various components of the SCT 62. The screen (signature capture area) 70, the volume control 78, and the port 84 are also shown. The SCT 62 further includes an audio generator 112 coupled to the speaker 76 and the audio jack 80. The audio generator is operative to convert a signature received by the screen 70 (an electronic signature signal) to an audio signal in accordance with the principles and in the same or similar manner as described with respect to the SCT 32 of FIG. 1. The audio signal is then provided to either or both the speaker 76 and the audio jack 80, again in the same or similar manner as that described with respect to the SCT 32 of FIG. 1. The SCT 62 also may include a retail terminal interface 114 that is operative to allow communication with the retail terminal 64.

Figure 5:
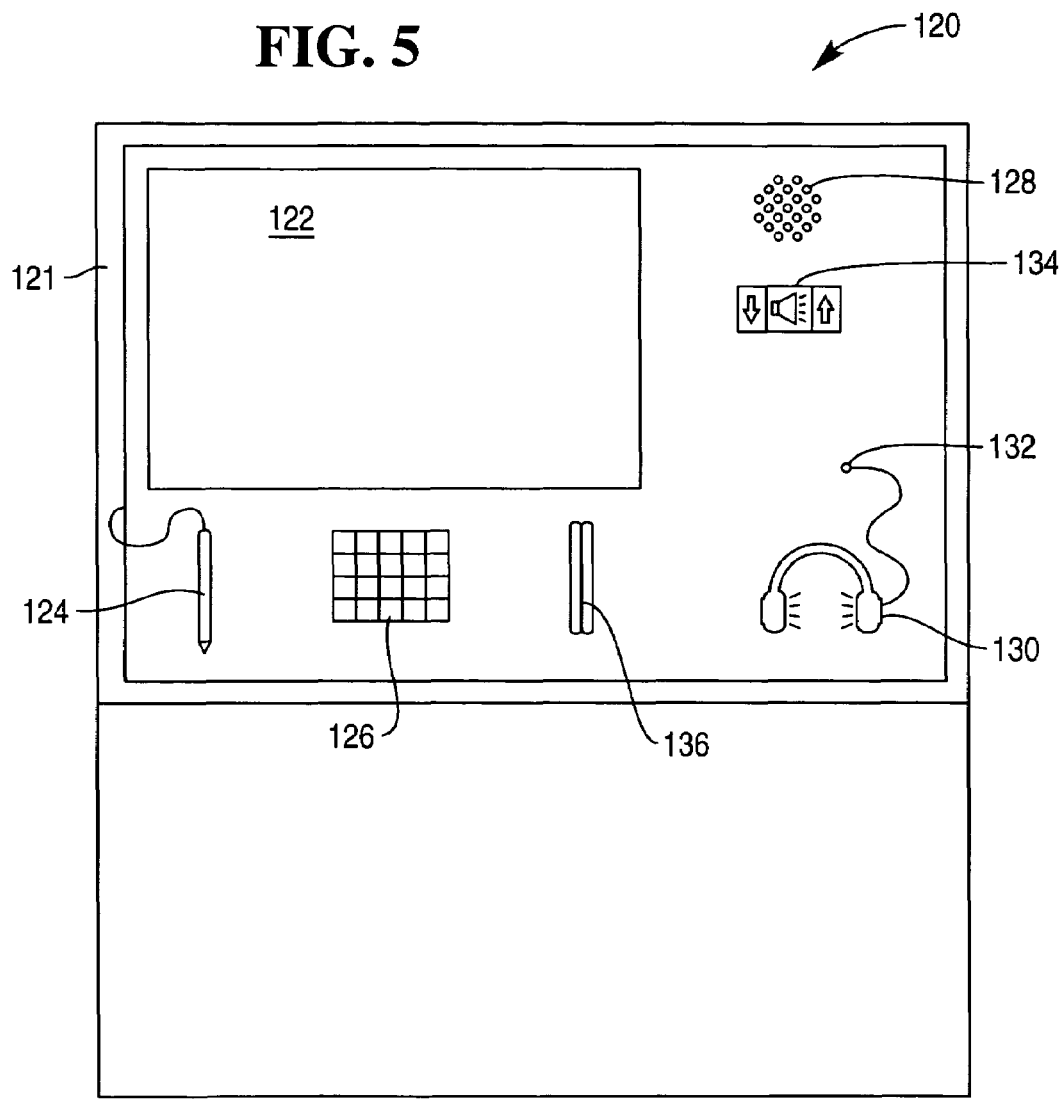
FIG. 5 is a front view of an exemplary kiosk configured to implement an aspect of the present invention in accordance with the principles presented herein.

Referring now to FIG. 5, there is depicted a kiosk, generally designated 120, that is operative to accept a signature of a user/consumer, typically in the context of a transaction, and produce audio feedback with respect to the received signature in the same or similar manner as the system 60 of FIGS. 3 and 4 and/or the SCT 30 of FIGS. 1 and 2. The kiosk 120 may be used for any type of transaction such as a retail transaction, EFT, and the like, and configured for substantially any purpose such as an automated teller machine (ATM), bill payment acceptor, or the like.

In general, the kiosk 120 functions as an SCT in addition to many other possible functions. The kiosk 120 includes a display, screen or the like, generally designated 122, that is operative to function as a signature capture device or area in like manner to the signature capture areas of the SCTs 30 and 64 discussed previously. A stylus 124 is provided for allowing a user to enter or write their signature onto the signature capture area 122 as required or necessary. Typical with kiosks, the kiosk 120 includes a keypad 126, shown in FIG. 5 as a mechanical keypad, but which may be a video keypad either separate from or integral with the signature capture area 122, and a card reader 136. The card reader 136 may be a magnetic strip reader, a smart card reader, a radio frequency identification (RFID) reader, or the like, that is operative to receive a like card as the case may be, and read information that is contained on or in the card. The information may be encrypted as well as encoded onto/into the particular type of card.

The kiosk 120 further includes a speaker 128 (or speakers), a headphone jack 132 into which is plugged a set of headphones 130, and a volume control 134 for the speaker 128 and/or headphones 130. The volume control 134 is operative to raise and/or lower the volume of the speaker 128 and/or headphones 130. In like manner to the system 60 of FIG. 2 and the SCT 30 of FIG. 1, the kiosk 120 is operative to receive a signature of a user/customer on the signature capture area 122, generate an audio signal in response to the received signature, and produce the audio signal so as to be audible on the speaker 128 and/or the headphones 130. The audio signal generated in response to the received signature indicates the position of the stylus 124 relative to the signature capture area 122. Stated another way, the audio signal correlates or corresponds to the graphic nature of the signature. In particular, at least one characteristic of the audio signal changes in correlation to the change in the signature. Thus, for example, as the horizontal position of the signature changes, amplitude may vary. As another example, the frequency or pitch of the audio signal may change as the vertical position of the signature changes. The audio signal may also change with respect to several characteristics during the writing of the signature, generally corresponding to the graphic nature of the signature. The user/consumer will be able to know where the signature is relative to the signature capture device, as well as providing the opportunity to recreate the same "audio signature" as the written signature.

Figure 6:
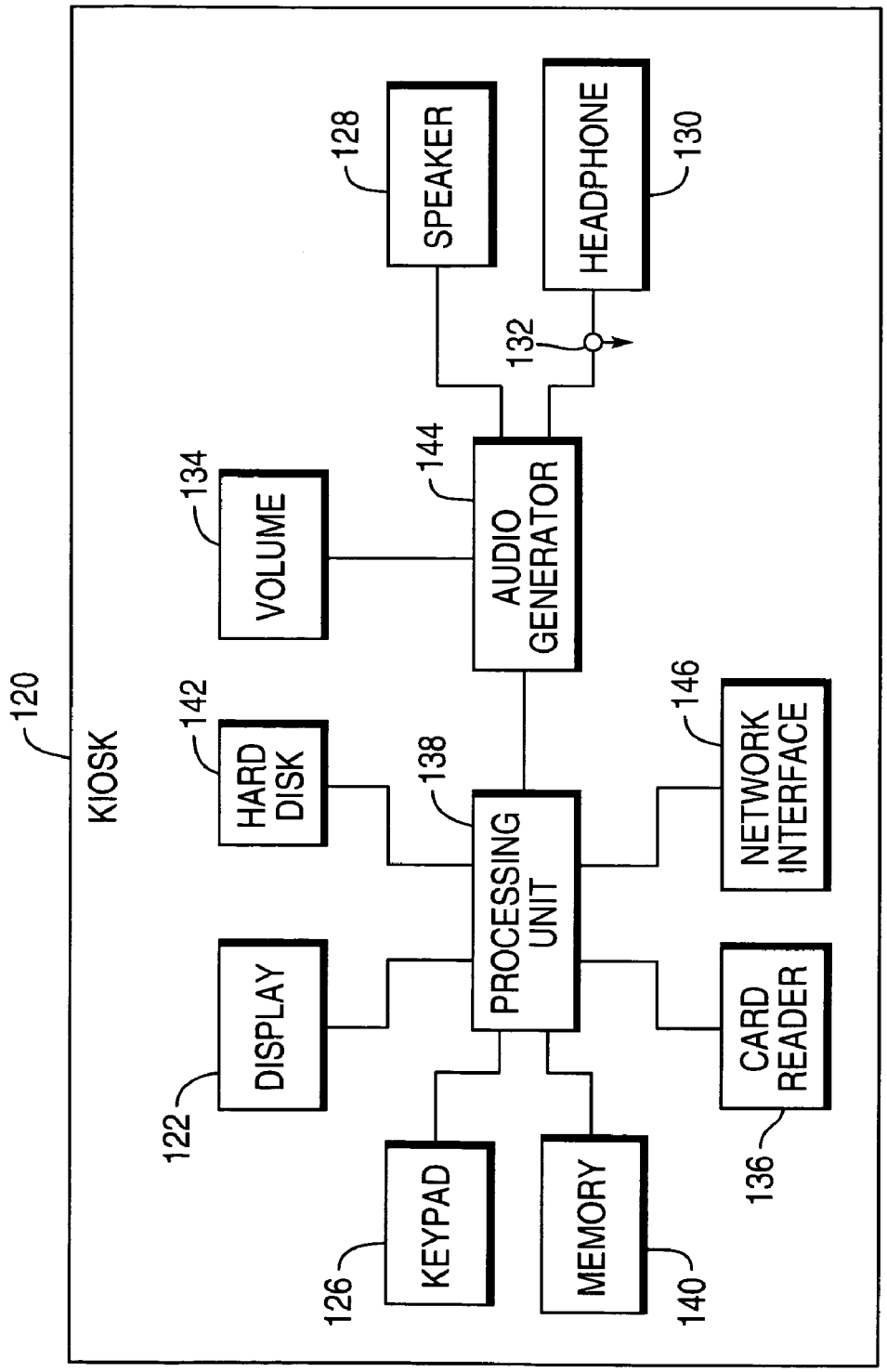
FIG. 6 is a block diagram of the components of the exemplary system of FIG. 5.

FIG. 6 depicts a block diagram of the kiosk 120. The kiosk 120 includes a processing unit 138 that is operative to control the various components of the kiosk and to execute program instructions as required. The display 122, keypad 126, and card reader 136 are in communication with the processing unit 138. The speaker 128 and headphones 130 via the jack 132 are in communication with an audio generator 144 that is in communication with the processing unit 138. The audio generator 144 is operative to produce the audio signature signal from the electronic signature signal in accordance with the principles presented herein. The volume control 134 is also depicted for controlling the volume of the speaker 128 and the headphones 130.

The kiosk 120 also contains memory 140 operative to at least temporarily store program instructions for operation of the kiosk and execution by the processing unit 138. A storage device such as a hard disk 142 is in communication with the processing unit 138 and is used for long-term/permanent storage of program instructions, data, and the like. A network interface 146 may also be provided for permitting the kiosk 120 to be in communication with an electronic network, telephone network, or the like.

It should be appreciated that the various components, features, and/or functions of the SCT 30, the system 60 and the kiosk 120 of FIGS. 1–6 may be combined with each other or be made a part of other devices that may be used for the same or similar purposes as those described above. The principles of the present invention described with reference to FIGS. 1–6 are applicable to other devices and/or embodiments.

Figure 7:
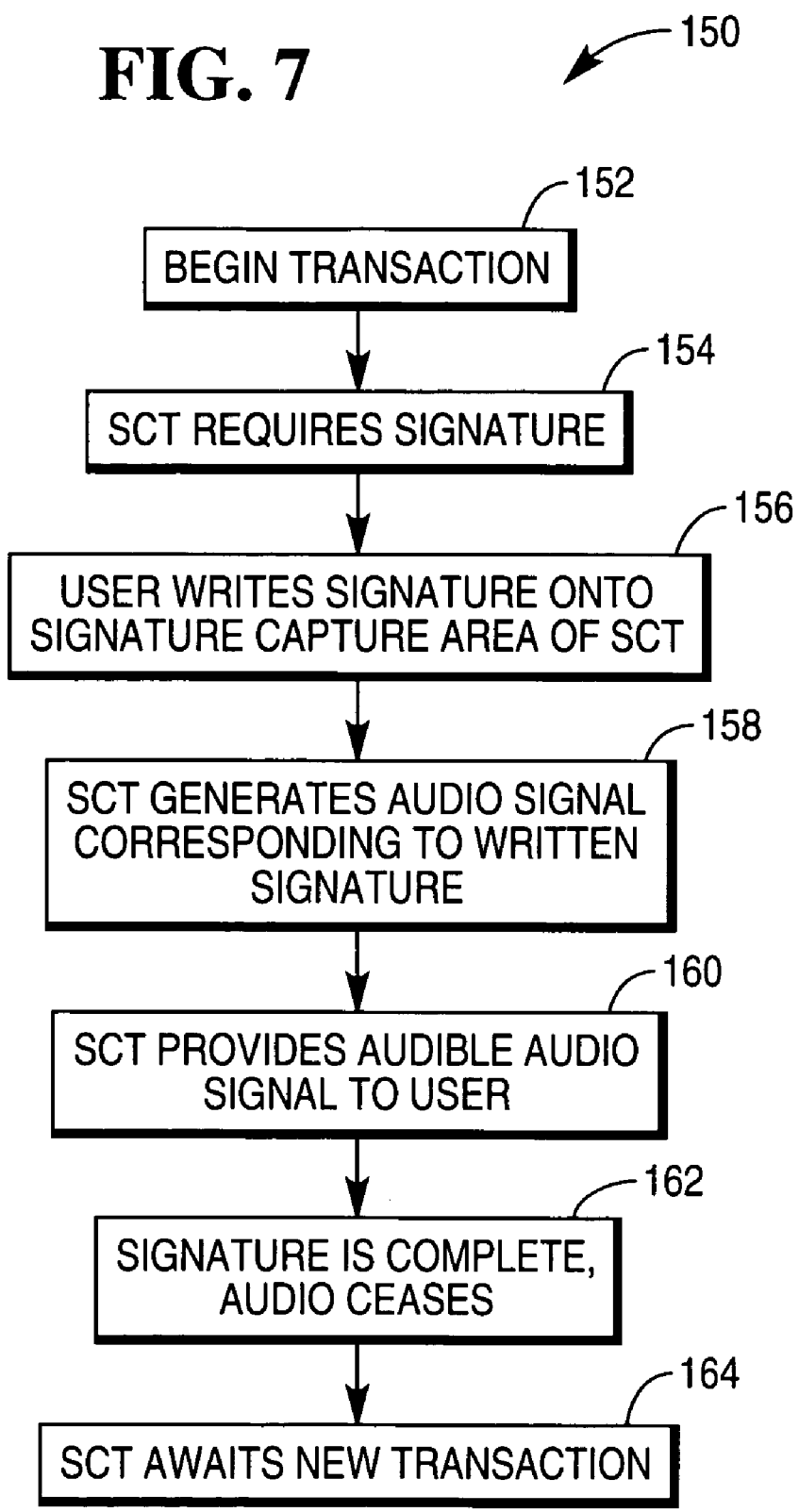
FIG. 7 is a flow diagram of a manner of operation of an aspect of the present invention.

Referring to FIG. 7, there is shown a flow chart, generally designated 150, illustrating a manner of operation of an aspect of the principles of the present invention, as described above with reference to FIGS. 1–6. It should be appreciated that the manner of operation depicted in the flowchart 150 of FIG. 7 is only exemplary of a manner of operation with respect to the embodiments of FIGS. 1–6. Additionally, the flowchart 150 should be considered as supplementary.

Initially, a user begins a transaction on a particular device, such as a signature capture terminal (SCT), block 152. The transaction is assumed to require a signature from a user sometime during the transaction. The SCT requires the input of a signature at a point in the transaction process, block 154. The user writes his/her signature on the signature capture area of the SCT in response to prompting by the SCT, block 156. Typically, the user will use a stylus that is supplied at the SCT.

As the user writes his/her signature, the SCT generates an audio signal that corresponds to or correlates with the written signature, block 158. The SCT provides the audio signal in audible form to the user, block 160, as the signature is being written. When the signature is complete, the audio ceases, block 162. The SCT then awaits a new transaction, block 164, or another point in the current transaction where a signature is required.

Figure 8:
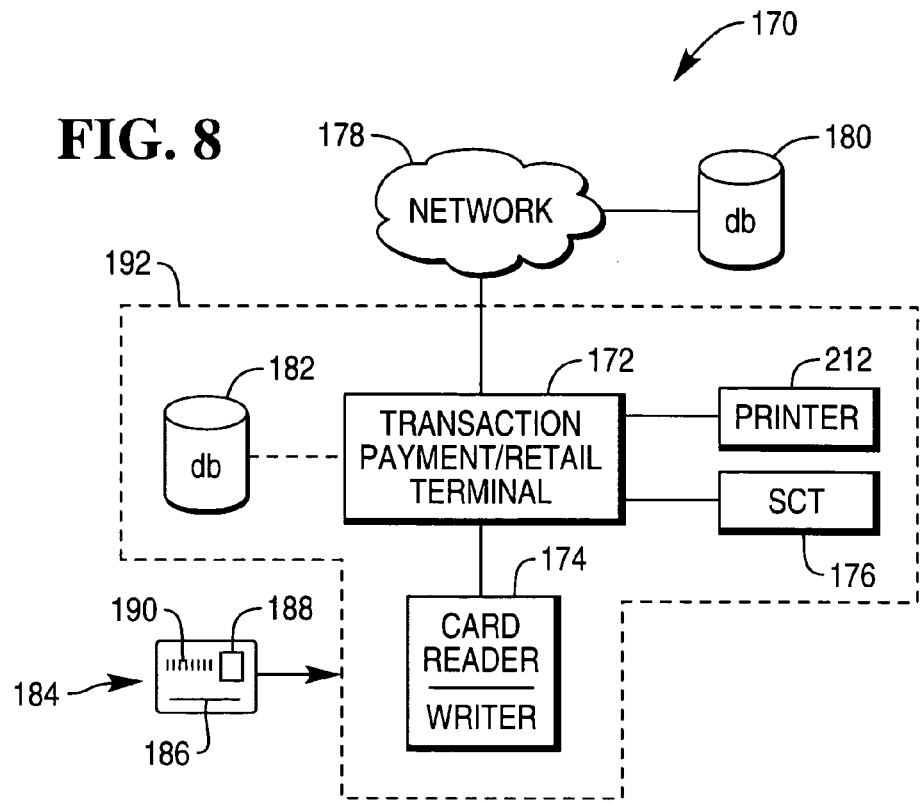
FIG. 8 is a diagram of an exemplary system configured to implement an aspect of the present invention in accordance with the principles presented herein.
Figure 9:
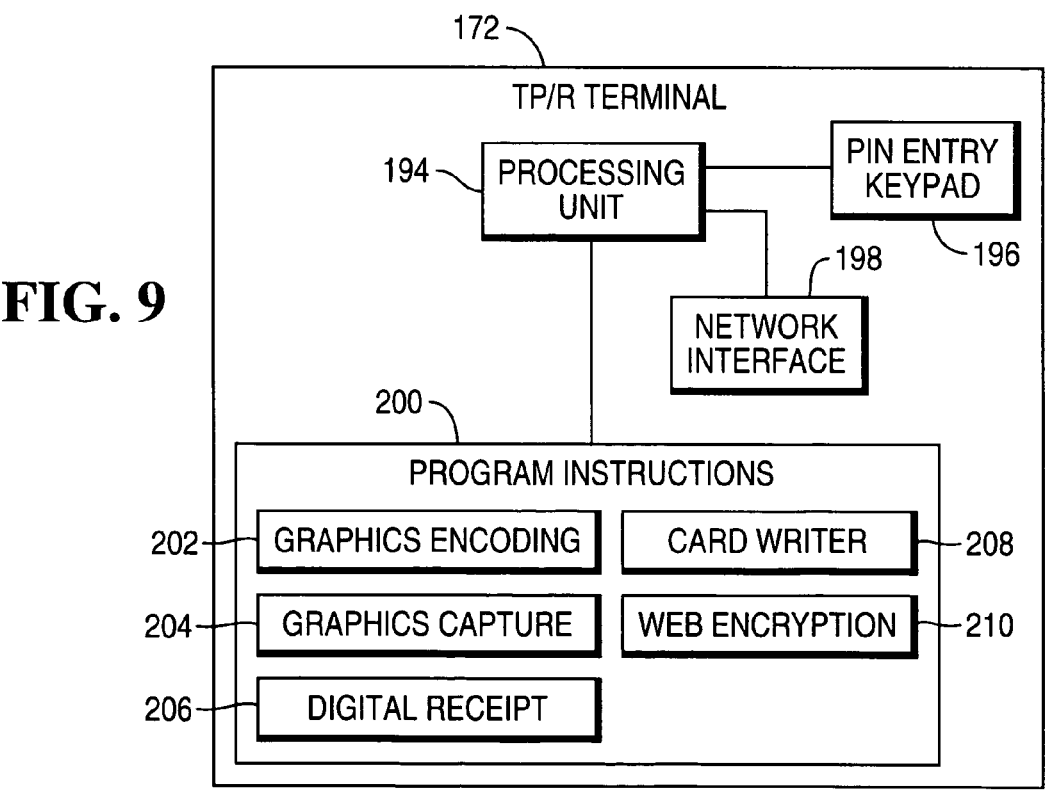
FIG. 9 is a block diagram representation of a portion of the system of FIG. 8.

Referring now to FIGS. 8 and 9, there is depicted a diagram of a system, generally designated, 170, that is operative/adapted to perform an aspect of the present invention as described below. In particular but in general terms, the system 170 is operative to capture a signature, graphically encode the signature, store the graphically encoded signature, recall the graphically encoded signature from storage for a transaction, utilize the graphically encoded signature to provide a representation of the original signature on a paper receipt for a transaction, generate a digital receipt for the particular transaction, and store the signature (graphically encoded or not) with the digital receipt.

The system 170 includes a transaction payment/retail terminal 172 on which a transaction is made. The transaction may be any type of transaction that requires a signature from the consumer such as a retail purchase, bill payment, electronic fund transfer, or the like. Such transactions are typically those involving credit cards, debit cards, other types of cards, and the like. As such the transaction payment/retail terminal 172 (hereinafter the transaction payment terminal) is representative of any type of terminal/device that accepts payment via a payment method that requires a signature.

A signature capture terminal (SCT) 176 is in communication with the transaction payment terminal 172. The SCT 176 may be the same as or similar to the SCT 30 of FIG. 1 or the SCT 62 of FIG. 3. However, in particular, the SCT 176 is operative to obtain the signature of the consumer on a signature capture area and convert, generate or produce the signature into an electronic signature signal. A card reader/writer 174 is also a part of the system 170. The card reader/writer 174 is operative to read a card, such as a magnetic strip card, smart card, radio frequency identification (RFID) card, and/or the like. As well, the card reader/writer 174 is operative to write to a magnetic strip card, smart card, RFID card, and/or the like. The transaction payment terminal 172, the SCT 176, and the card reader/writer 174 may be separate components or may be embodied in one device as indicated by the dashed line 192. In either case, the manner of operation is the same as below described.

The transaction payment terminal 172 is in communication with a network 178 such as an electronic network and, preferably, to the Internet. A database 180, such as a data warehouse, is in communication with the network 178 and is operative to receive data, store data, and permit access to stored data via the network 178. Optionally, as indicated by the dashed line, the transaction payment terminal 172 may be coupled to a database 182 that may be integral with the combined terminal 192, or be accessible via a local network.

The transaction payment terminal 172 includes a processing unit 194 that is operative to execute various program instructions 200 and provide a controller/interface for the various components of the transaction terminal 172 that are and are not shown. The transaction payment terminal 172 also includes a PIN (Personal Identification Number) keypad 196 (or other similar input device) that is operative to accept input from the consumer regarding a consumer's PIN. The PIN keypad 196 is in communication with the processing unit 194. A network interface 198 is also provided that is operative to allow the transaction payment terminal 172 to be in communication with the network 178. The network interface 198 is in communication with the processing unit 194.

The transaction payment terminal 172 is operative to accept a signature of a consumer via the SCT 176. The presentation of the consumer's signature may be in response to an initial set-up process for this particular aspect of the present invention, or it may be in response to a transaction that requires a signature. In accordance with an aspect of the present invention, the transaction payment terminal 172 is operative via graphics capture program instructions 204 to electronically capture the signature entered or written on the SCT 176. The electronically captured signature is transformed into an electronic signature. The transaction payment terminal 172 also utilizes graphics encoding program instructions 202 to graphically encode the electronic signature. Web (Internet) encryption program instructions 208 are utilized to encrypt the graphically encoded electronic signature signal. The now web encrypted, graphically encoded electronic signature is forwarded to the database 180 for storage at a particular address. The address of the web encrypted, graphically encoded electronic signature is preferably a URL (Uniform Resource Locator) for the storage location within the database 180. In this manner, input of the URL into a web-enabled device (such as the transaction payment terminal 172) will call up or locate the web encrypted, graphically encoded electronic signature.

The address (e.g. and hereinafter URL) of the web encrypted, graphically encoded electronic signature is transferred or put onto a card 184 via the card reader/writer 174 using card writer program instructions 208. The card 184 may have a magnetic strip 186 onto which the web encrypted, graphically encoded electronic signature and other information are written. The card 184 may have an RFID tag 188 onto which the web encrypted, graphically encoded electronic signature and other information are written. The card 184 may have other readable/writ table indicia 190 onto which the web encrypted, graphically encoded electronic signature and other information are written. The card 184 may be a business or store card (e.g. a frequent shopper card or the like) or may be a conventional magnetic strip type card, a smart card, an RFID type card or the like onto which the web encrypted, graphically encoded electronic signature is additionally written.

Once the URL is written onto the card via the card reader/writer 174 it is operative according to an aspect of the present invention. In particular, when the card 184 is used for a transaction, with the transaction requiring a signature, the card reader/writer 174 obtains any necessary transaction information previously written onto the card 184 (i.e. account data, PIN data, and other data, or "obtained data") including the URL of the web encrypted, graphically encoded electronic signature in the database 180. Preferably, the consumer then enters his/her PIN on a PIN entry keypad 196 of the transaction payment terminal 172 to provide authenticity for the user of the card 184. A correct PIN allows the transaction payment to proceed, while an incorrect PIN ceases the transaction.

Assuming the correct PIN entry, the obtained data is used to process payment and other functions. The obtained URL allows the transaction payment terminal 172 to obtain the web encrypted, graphically encoded electronic signature from the database 180 via the network 178 (or alternatively, from the database 182). The transaction payment terminal 172 then de-encrypts and graphically de-encodes the web encrypted, graphically encoded electronic signature to obtain a "reproduced original" of the signature and provides the reproduced original signature on a paper receipt printed by a printer 212 without the user having to provide the signature. In addition, digital receipt program instructions 206 are used to generate a digital receipt that is also stored either in the database 182 or the database 180, and may be electronically forwarded to the consumer via their e-mail address which may be part of the other data of the card 184. The digital receipt includes either the web encrypted, graphically encoded electronic signature or the reproduced original.

Referring now to FIG. 10A, there is depicted a flow diagram, generally designated 220, depicting an exemplary manner in which an "initial" phase of an aspect of the present invention is accomplished. In particular, before a consumer can utilize a card as described above with reference to FIGS. 8 and 9, the consumer's signature must be obtained. The consumer's signature is obtained on a signature capture device (SCT) such as those shown and described herein, block 222, in a manner also described herein in conjunction with the description of the SCT. The captured signature is then graphically encoded according to a graphics encoder, block 224. Thereafter, the encoded signature is encrypted with a web (Internet) encryption method, block 226.

The encoded and encrypted signature is then stored in a storage device, block 228. The storage device is preferably a data warehouse that is in communication with the Internet. As such, each storage location in the data warehouse has an Internet address or URL. Once the encoded and encrypted signature is stored at a storage location within the storage device, the address (e.g. URL) of the storage location is obtained, block 230. Once the storage location is obtained for the encoded and encrypted signature, the address is written onto/into a user's card, block 232.

Referring now to FIG. 10B, there is depicted a flow diagram, generally designated 240 of a manner of using a card onto which the address of the encoded and encrypted signature has been stored. A transaction requiring a signature and/or card is initiated on a transaction payment terminal, block 242. At the appropriate point in the transaction, the user's card is read by the transaction payment terminal, block 244. Reading the user's card obtains the address (e.g. URL) previously stored thereon, in addition to obtaining other data required for the transaction. In order to verify or authenticate the transaction (i.e. whether the cardholder is the owner/authorized user), the user enters his/her PIN, block 246. Correct entry of the PIN, provides authorization to proceed with the transaction.

The transaction payment terminal logs onto the address obtained during reading of the card, block 248. The encoded and encrypted signature is retrieved by the transaction payment terminal from the storage location specified by the address obtained from the card, block 250. Thereafter, the encoded and encrypted signature is decrypted and decoded to obtain the original signature (i.e. an electronic representation of the original signature), block 252. The original signature is then printed onto a paper receipt, block 254, when the transaction is complete. In addition, the signature is appended to a digital receipt generated from the transaction that is then stored in a storage device, block 256.

Figure 11:
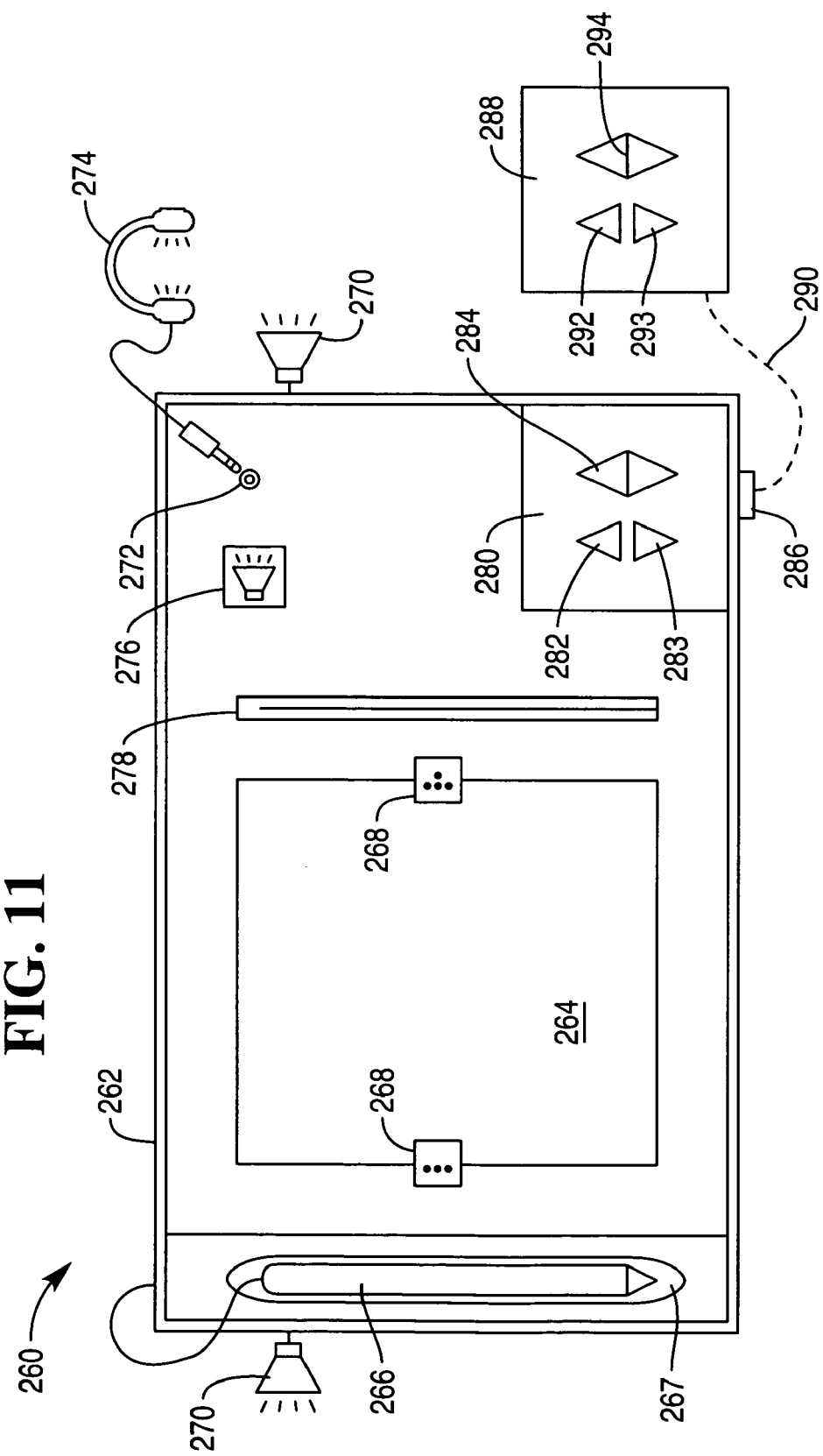
FIG. 11 is a representation of a signature capture terminal having a built-in EZ Access Terminal and shown couplable to an external EZ Access Terminal.

With reference now to FIG. 11, there is depicted another embodiment of a signature capture terminal (SCT) generally designated 260. In particular, but in general terms, the SCT 260 is operative to accept entry of a PIN for transactions requiring a PIN via a disability access device. The entry of a PIN via the disability access device is preferably accompanied by the production of secure audio. Other data may be entered into the SCT 260, preferably via the disability access device, in response to menu choices presented by the SCT 260.

The SCT 260 is characterized by a housing 262 that supports a screen or display 264. The screen 264 is a touch screen, sonar screen, or the like, in like manner to the screen 34 of the SCT 30. The screen 264 forms, at least in part, a signature capture area. A stylus for writing onto the screen 262 is provided, retained when not in use within a tray 267. Raised alignment tabs 268 are disposed on both sides of the screen 264 preferably in the middle (relative to vertical direction) thereof. The alignment tabs 268 include indicia such as Braille for a tactile indication of their presence. The alignment tabs provide boundary markers for the screen/signature capture area 264.

The SCT 260 includes speakers 270 and an audio jack 272 to which may be coupled a set of headphones 274. A volume control 276 is provided that is operative to raise and/or lower the volume of the speakers and any headphones connected to the audio jack 272. A card reader 278 is also provided that is operative to read a magnetic strip type card, a smart card, RFID type card, or the like. In accordance with an aspect of the present invention, the SCT 260 includes either an integral disability access device 280 or an external disability access device 288. The integral disability access device 288 and external disability access device 288 are the same with the exception that the external disability access device 288 includes an interface cable 290 that is adapted to be accepted (i.e. plug into) the port 286. Preferably the port 286 is a Universal Serial Bus (USB) port and thus the interface cable 290 is configured accordingly including a USB termination plug (not shown). The integral disability access device 280 includes three (3) buttons, an Up button (an "up" triangle) 282, a Down button (a "down" triangle) 283, and an Enter button (a diamond) 284. In like manner, the external disability access device The disability access devices 280 and 288 are designed to allow a user with a disability to more easily access the SCT 260, enter information/data into the SCT 260, and/or navigate through and choose various menu options presented visually onto the screen 264 or presented audibly via the speakers 270 and/or headphones 274. The disability access devices 280 and 288 are preferably based on or are EZ Access™ systems i.e. terminals/devices and accompanying software (collectively the EZ Access™ system) developed by the Trace Center College of Engineering of the University of Wisconsin—Madison. Particular information regarding the EZ Access™ system may be found at their web site www.trace.wisc.edu. As well, reference is made to U.S. Pat. No. 6,049,328 (the "'328 patent") issued to Vanderheiden on Apr. 11, 2000 and assigned to Wisconsin Alumni Research Foundation, which is specifically incorporated herein by reference. The '328 patent discusses the EZ Access™ system in greater detail.

In addition to being operative to receive a signature on the signature capture area 264, the SCT 260 is also preferably a payment terminal that accepts/reads a card presented to the card reader 278. In particular, the SCT 260 is preferably adapted to perform secure financial transactions that require a PIN to be entered. This is typically the case for a fund transfer, a credit card purchase, a debit card purchase, or the like. Once the SCT 260 accepts/reads a card presented to the card reader 278 and requires a PIN, a user's PIN is entered using the disability access device 280 or 288. At the same time, the SCT generates audio feedback for the entered PIN. Such audio feedback may be in the form of touchtone (for numeric entry). For menu choices, the SCT 260 may provide audio feedback in the form of voice synthesized test-to-speech.

In any case, the audio feedback is preferably provided to the user based on secure audio concepts. Particularly, the audio feedback from the SCT 260, including the disability access device 280/288, is supplied just to the headphones 274 so that only the person wearing the headphones will be able to hear the audio feedback and respond thereto. When the headphones are not utilized, secure audio may be produced by one or more of the speakers 270 (collectively, speakers). In this case, the speakers 270 provide directional audio to the consumer of the audio feedback. Thus, as the user enters his/her PIN into the SCT 260 and/or selects menu options from the screen 264, secure audio feedback is produced/generated and provided to the user.

In like manner to the system 60 of FIG. 3 described above, the SCT 260 generates and provides various audio signals that correspond to various inputs, transactions, events, and/or the like performed on or by the SCT 260. Each audio signal is provided in the secure audio format described above. Thus, each audio signal is different for each input, transaction, event and/or the like and in the secure audio format.

Figure 12:
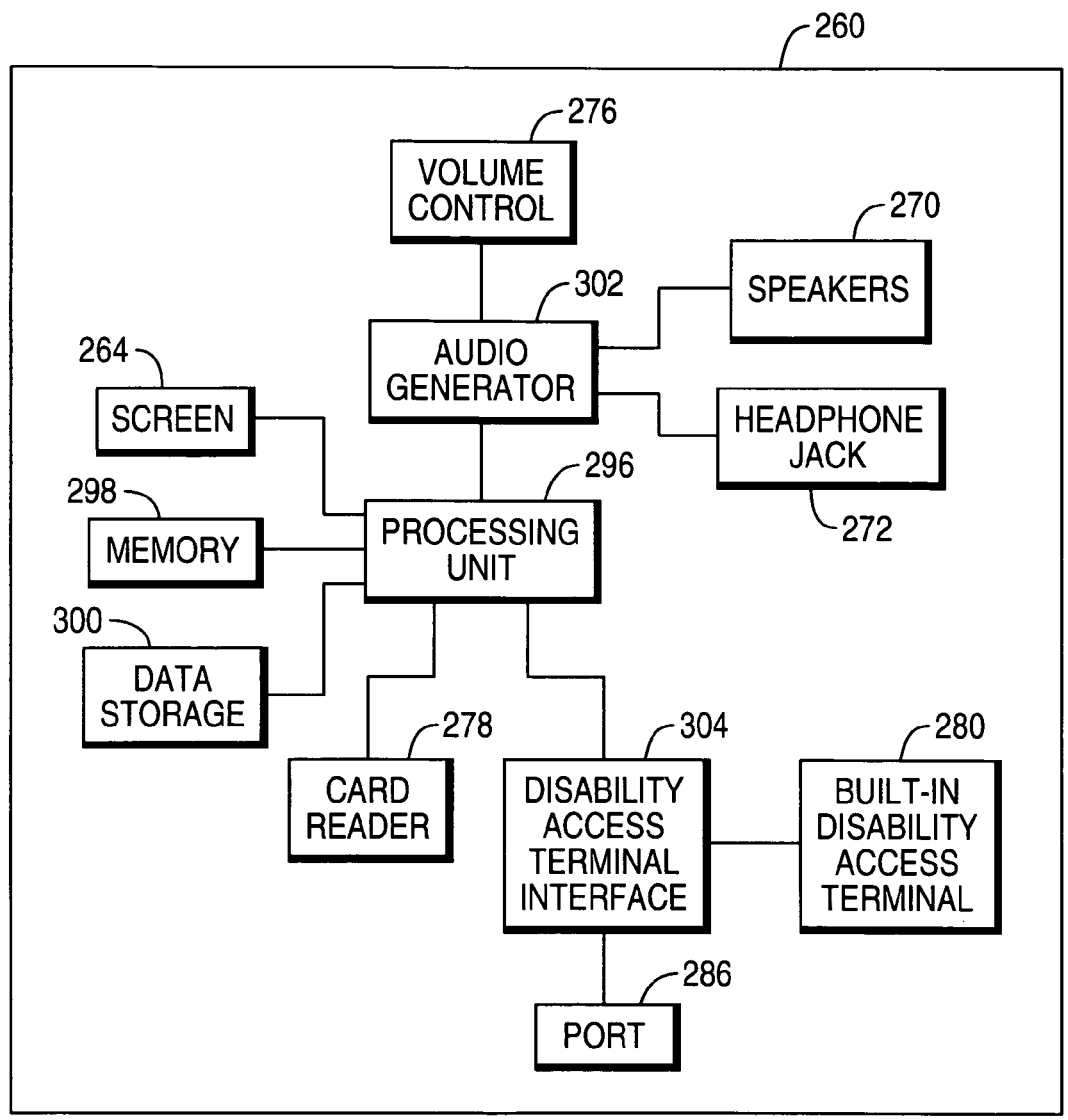
FIG. 12 is a block diagram of the signature capture terminal of FIG. 11.

Referring now to FIG. 12, a block diagram of the SCT 260 is depicted. The SCT 260 includes processing unit 296 to which is coupled the screen 264, and the card reader 278. The SCT 260 further includes memory 298 that is operative to at least temporarily store program instructions that are executable by the processing unit and control the various functions/features of the SCT 260, and a data storage device 300, such as a hard disk, that stores the program instructions for recall and loading into the memory 298. In order to produce/generate the secure audio, an audio generator 302 is provided that is in communication with the processing unit 296. The volume control 276 is in communication with the audio generator 302 to control the volume of the speakers 270 and any headphones via the audio jack 272 that are in communication with the audio generator 302.

Program instructions for the disability access device 280 may be stored in the data storage 300 or may be stored in or hard-wired as part of a disability access device interface 304 that is in communication with the processing unit 296. The disability access device interface 304 provides a functional interface between the disability access device 280 and the disability access device 288 via port 286 with the other components of the SCT 260 in accordance with the principles set forth herein. During this mode of data entry, any keystrokes that may be displayed on the screen 264 may be masked.

Figure 13:
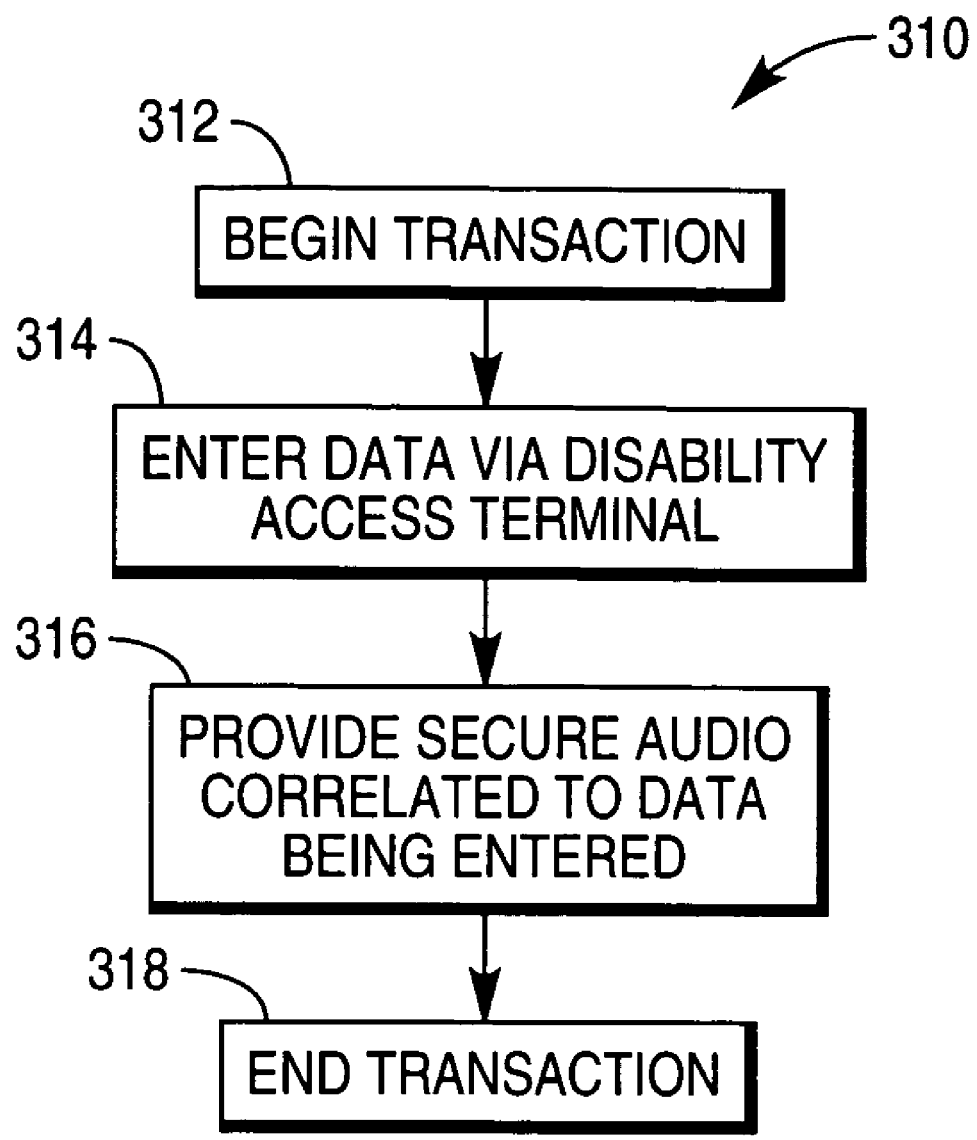
FIG. 13 is flow diagram of a manner of operation of an aspect of the present invention.

FIG. 13 depicts a flow chart, generally designated 310, of a manner of operation in accordance with an aspect of the present invention as described in conjunction with FIGS. 11 and 12. Initially, a transaction begins at the signature capture terminal, block 312. The transaction in this particular example, without being limiting, is a financial transaction such as a payment, an electronic fund transfer, or the like. As part of the transaction, data, such as a PIN, is entered into the signature capture terminal via the disability access device, block 314. In addition to the entry of data, the disability access device allows menu choices via the screen of the signature capture device or by voice via the speakers or a set of headphones coupled thereto.

For at least the data (e.g. PIN) entered into the signature capture terminal via the disability access device, or alternatively, all entries into the signature capture terminal via the disability access device, secure audio is generated that correlates with or corresponds to the data being entered, block 316. The secure audio is provided to the user via the headphones or the speakers. After all data has been entered and/or menu choices have been made, and the particulars of the transaction have occurred, the transaction ends, block 318.

Figure 14:
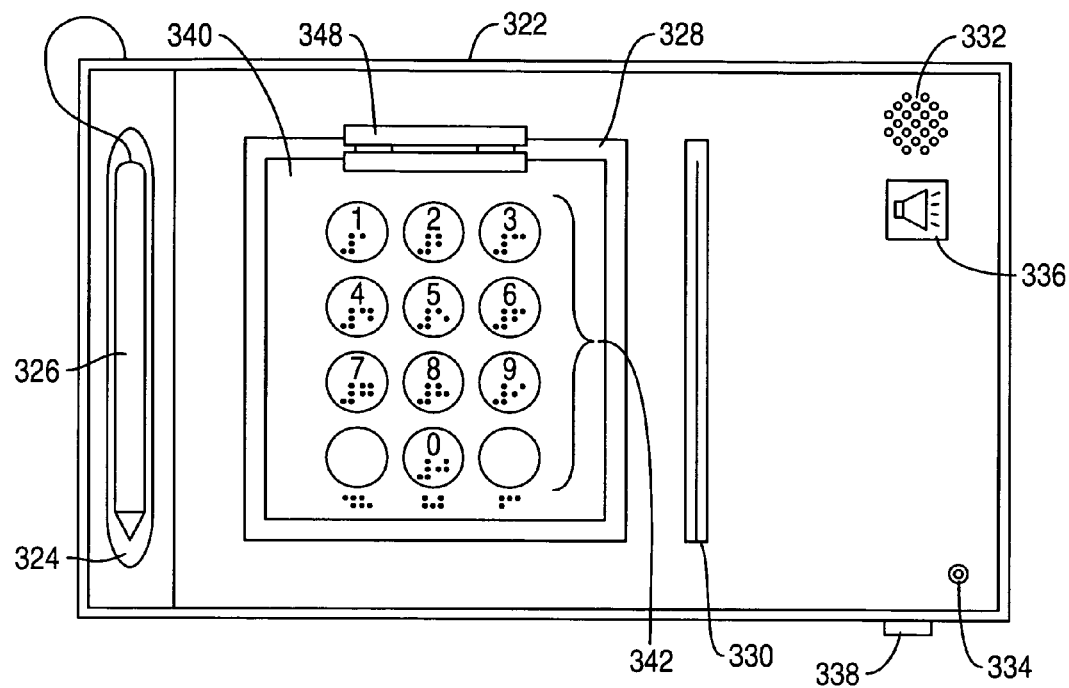
FIG. 14 is a representation of a signature capture terminal having an overlay.

Referring now to FIG. 14, there is depicted another embodiment of a signature capture terminal (SCT), generally designated 320. The SCT 320 is operative in the same general manner and includes the same general components as the previously described SCTs. Thus, as an overview, the SCT 320 includes a stylus tray 324 that is adapted to hold a stylus 326 for writing a signature on a screen 328. The screen 328 is a touch screen utilizing any one of a variety of touch screen technologies. As such, the screen 328 is adapted to display information and/or selectable options or menu choices in addition to being a signature capture area.

The SCT 320 further includes a card reader 330 that is operative to read various types of cards (i.e. magnetic strip, smart card, RFID), a speaker 332 for producing sound generated by the SCT 320 or otherwise, a headphone jack 334 a volume control 336 for the speaker 332 and the headphone jack 334, and a port 338 such as a USB port for connection to a peripheral or the like.

In accordance with an aspect of the present invention, the SCT 320 is provided with an overlay 340. The overlay 340 may be removable and includes a plurality of resilient buttons 342 that allow entry of information onto the screen 328. In particular, when the overlay is positioned on or over the screen 328, the screen 328 is active to receive input from a particular button 342 in the same or similar manner as the screen 328 would receive input from the touch of a finger or writing by a stylus. In one form, the buttons 342 form a keypad that is "oversize" with respect to a traditional keypad. The keypad allows entry of a PIN or the like. In this manner the overlay provides a user with a disability an easier manner of entering a PIN or other information, depending on the configuration of the overlay, the type of buttons, and/or the screen functionality when the overlay is positioned thereon. When the overlay 340 is not positioned over the screen 328, the screen 328 may provide a traditional touchscreen keypad mode for input of a PIN or other information, provide a signature capture area mode of operation, or the like. The overlay 340 is preferably coupled to the housing 322 via a hinge 348 or the like that allows the overlay 340 to be positioned over the screen 328 and positioned away from the screen 328. A sensor or the like (not shown) may be provided to indicate the position of the overlay 340 with respect to the screen 328.

According to another aspect of the present invention, the overlay 340 may have tactile indicia such as Braille either on the particular button 342 (as depicted with respect to the numbered buttons) or adjacent a button 342 (as depicted with respect to the unlabeled buttons). This provides further ease of recognition and/or operation for a visually impaired individual. In one form, the tactile indicia may be provided adjacent each button 342 while a traditional raised dot on the "5" button may be used. Of course, other schemes are acceptable.

Figure 15:
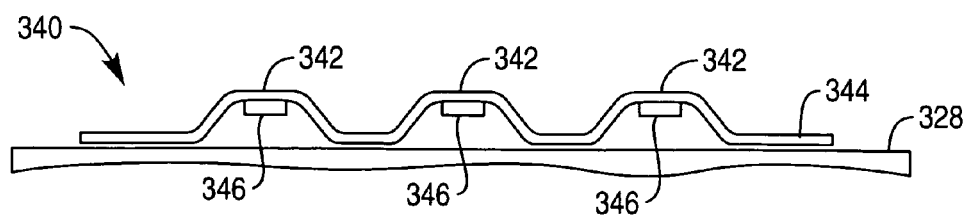
FIG. 15 is a side sectional view of the overlay of FIG. 14.

Referring to FIG. 15, the overlay 340 is shown in greater detail. The overlay 340 utilizes rubber dome technology to form the buttons 342. A sheet 344 of a resilient material such as rubber is formed with a plurality of domes each of which corresponds to a button 342. The buttons 342 formed by the resilient sheet 344 bounce back to their original position after being pushed or depressed. This provides a positive feel for a user to indicate that a button has been pressed. As such with rubber dome technology, each dome or button 342 has a ceramic bead or pad 346 on an underside thereof that is adapted to contact the screen 328 when the respective button 342 is depressed.

In accordance with a further aspect of the present invention, when a button 342 is depressed, the SCT 320 produces or generates audio feedback for the user via the speaker 332 and/or a set of headphones plugged into the headphone jack 334. Such audio feedback may include simple audio monotones when the buttons 342 make contact with the screen 328, voice synthesized speech, or touchtone emulation.

The various signature capture terminals (SCTs) shown and described above have common capabilities with respect to the common components. It should be appreciated the SCTs shown and described above all include an aspect of functionality that permits the SCT to be more easily used by a disabled individual. Some provide easier access to the existing functionality of the SCT by a disabled individual. In view of this, the following capabilities of the common components of the various SCTs described above will now be described.

The screen or display of the SCT is preferably a high-resolution display that can display character contrast ratios greater than seven to one (7 to 1) and character sizes larger than 24 minutes of arc. The SCT may include screen magnification program instructions to enlarge the information presented on the display. This feature may be selectable by the user in a variety of manners such as by the display, as a separate button on the SCT, or the like. The SCT may also include scalable graphic display program instructions that permit reformatting of display information (e.g. text) for readability. This includes reformatting of text size as well as screen color (text and background, contrast and the like) for color blind and/or low vision users. Again, this feature may be selectable by the user in a variety of manners.

Additionally, the headphone jack may provide audio to a set of headphones plugged therein in a stereo format. In addition to text-to-speech and other audio formats as described above, multiple languages may be provided as part of the text-to-speech. Other audio formats for specific disabilities may be provided. As well, the port (e.g. a USB port) of the SCT may be used to connect the SCT into a host terminal such as a POS, PC, or the like.

Finally, the SCT may provide an additional level of security through PIN encryption. Thus, PIN entry via a disability access device, and even a typical PIN entry keypad, will include encryption. The various features, modes, and/or functionality described herein include a level of security and privacy for disabled users of the SCT, through the disability access devices including audio enhanced navigation, audio feedback, enhanced display navigation, and others.

It should be appreciated that the various features, modes, and/or functions of the various embodiments of a signature capture terminal as shown and described herein may be combined with one another to form various combinations. As well, the various embodiments of the signature capture terminals may be incorporated into other electronic devices, or those electronic devices shown and described herein may as already incorporating a signature capture terminal may be used for other purposes.

While this invention has been described as having a preferred design and/or configuration, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the claims.

What is claimed is:

1. A signature capture terminal comprising:
a signature capture screen operative to graphically receive a signature of a user; and
an audio generator operative to produce audio feedback to the user in direct response to receipt of the signature, the audio feedback correlated to graphic input of the received signature.

2. The signature capture terminal of claim 1, wherein the audio feedback comprises an audible sound having a characteristic thereof that varies in relation to the graphic input of the received signature.

3. The signature capture terminal of claim 2, wherein the characteristic comprises one of frequency, pitch, and amplitude.

4. The signature capture terminal of claim 1, wherein the audio feed back is provided as secure audio.

5. The signature capture terminal of claim 1, further comprising:
a disability access device operable to receive a PIN; and
wherein the audio generator is operative to provide further audio feedback corresponding to input of the PIN.

6. A method of operating a signature capture terminal having an input device, comprising the steps of:
entering a written signature with a stylus into said input device of said signature capture terminal, and generating signature data in response thereto;
storing said signature data in a memory of said signature capture terminal; and
generating audio feedback in response to said entering step, said audio feedback having characteristics correlated to attributes of said written signature.

7. The method of claim 6, wherein at least one of said attributes of said written signature includes horizontal position of said written signature on a signature capture area of said input device.

8. The method of claim 6, wherein at least one of said attributes of said written signature includes vertical position of said written signature on a signature capture area of said input device.

9. The method of claim 6, wherein:
said audio feedback generating step includes the step of generating an audio signal in response to said entering step, and
at least one of said characteristics of said audio feedback includes frequency of said audio signal.

10. The method of claim 6, wherein:
said audio feedback generating step includes the step of generating an audio signal in response to said entering step, and
at least one of said characteristics of said audio feedback includes amplitude of said audio signal.

11. The method of claim 6, further comprising the step of displaying a visual image of said written signature with a display device in response to said entering step.

12. The method of claim 6, wherein said input device is selected from the group consisting of: a touch screen input device, a sonar screen input device, and a pressure sensitive transducer input device.

13. A method of operating a signature capture terminal having an input device, comprising the steps of:
entering a written signature with a stylus into said input device of said signature capture terminal;
displaying a visual image of said written signature on a display device of said signature capture terminal; and
generating audio feedback in response to said entering step, said audio feedback having characteristics correlated to attributes of said written signature.

14. The method of claim 13, wherein at least one of said attributes of said written signature includes horizontal position of said written signature on a signature capture area of said input device.

15. The method of claim 13, wherein at least one of said attributes of said written signature includes vertical position of said written signature on a signature capture area of said input device.

16. The method of claim 13, wherein:
said audio feedback generating step includes the step of generating an audio signal in response to said entering step, and
at least one of said characteristics of said audio feedback includes frequency of said audio signal.

17. The method of claim 13, wherein:
said audio feedback generating step includes the step of generating an audio signal in response to said entering step, and
at least one of said characteristics of said audio feedback includes amplitude of said audio signal.

18. The method of claim 13, wherein said input device is selected from the group consisting of: a touch screen input device, a sonar screen input device, and a pressure sensitive transducer input device.

* * * * *